United States Patent [19]

Trepka et al.

[11] 4,105,714
[45] Aug. 8, 1978

[54] COUPLING OF ALKALI METAL-TERMINATED POLYMERS

[75] Inventors: William J. Trepka; Alvin C. Rothlisberger, both of Bartlesville, Okla.

[73] Assignee: Phillips Petroleum Company, Bartlesville, Okla.

[21] Appl. No.: 678,095

[22] Filed: Apr. 19, 1976

[51] Int. Cl.$^2$ .............................. C08F 8/18; C08F 8/30; C08F 8/04
[52] U.S. Cl. ............................ 260/879; 260/880 B; 526/20; 526/21; 526/25; 526/26; 526/46; 526/50
[58] Field of Search ............... 526/50, 46, 20, 21, 526/25, 26; 260/879, 880 B

[56] References Cited

U.S. PATENT DOCUMENTS

| 2,997,452 | 8/1961 | Makowski et al. | 526/50 X |
|---|---|---|---|
| 3,168,518 | 2/1965 | Harrison | 526/50 X |
| 3,177,190 | 4/1965 | Hsieh | 526/50 X |
| 3,274,147 | 9/1966 | Zelmski et al. | 526/41.5 |
| 3,281,383 | 10/1966 | Zelinski et al. | 526/50 X |
| 3,478,006 | 11/1969 | Pilling | 526/50 X |
| 3,674,767 | 7/1972 | Lilly et al. | 526/50 X |

Primary Examiner—William F. Hamrock

[57] ABSTRACT

Alkali metal-terminated polymers of one or more alkadienes and of one or more vinyl-substituted aromatic monomers are effectively coupled by trichloro-, tribromo- or triiodo-s-triazine.

18 Claims, No Drawings

COUPLING OF ALKALI METAL-TERMINATED POLYMERS

The present invention relates to novel coupled polymers. In one of its more specific aspects, this invention relates to a process for the production of such coupled polymers. Another aspect of this invention relates to the coupling of alkali metal-terminated polymers.

BACKGROUND OF THE INVENTION

It is well known in the art to produce polymers from monomers such as butadiene and styrene by contacting these monomers in a diluent with an alkali metal initiator. Alkyllithium initiators are oftentimes used and produce polymers with a variety of properties depending upon the specific monomers used and the process steps, as well as the polymerization conditions. At the end of the polymerization, a polymer that is terminated by one or more alkali metal atoms is obtained.

It is also known in the art to couple such alkali metal-terminated polymers, e.g., lithium-terminated polymers. In accordance with this known process, an alkali metal-terminated polymer is treated with a compound having two or more functional groups containing two or more reactive sites capable of reacting with the carbon-alkali metal bonds on the alkali metal-terminated polymer. The multifunctional coupling agent thereby becomes a nucleus for the resulting structure. From this nucleus long-chain polymer branches radiate, and such coupled polymers have specific properties that render them useful for particular applications.

Coupled polymers that are derived from coupling agents possessing three or more reactive sites are frequently called radial polymers in order to distinguish them from linear polymers that are either not coupled at all or that are coupled by only a bifunctional coupling agent. Such radial polymers have been of particular interest because of their increased Mooney viscosity, the improved processability, and the reduced cold flow as compared to the uncoupled or parent polymers. Hydrogenation of the alkadiene-based radial polymers has received considerable attention in recent years because the hydrogenation of such polymers increases the resistance thereof to environmental attack, e.g., to oxygen and/or ozone deterioration, as well as to deterioration by heat, light and particularly ultraviolet light.

It has, however, been found that some of these radial polymers are not sufficiently stable under hydrogenation conditions. More specifically it has been found that radial polymers that have a connection between an inorganic atom and the first carbon atom of the parent polymer chain sometimes are not as stable as radial polymers in which the connection between the coupling agent and the polymer is a carbon-carbon bond. A cleavage of the bond between the inorganic atom of the coupling agent and the carbon atom of the polymer chain occurs under hydrogenation conditions. If this cleavage occurs to a considerable degree, the hydrogenated radial polymer is admixed with hydrogenated but no longer coupled polymer chains which results in impairing the properties of the coupled polymer. Thus it would be desirable to have a coupled polymer available that can be hydrogenated without substantial cleavage of the polymer chains from the coupling agent. Furthermore, it would be desirable to have a coupling agent available which does not contain inorganic atoms connected to the active sites of the coupling agent and susceptible to this cleavage. At the same time it would be desirable that this coupling agent achieves a high degree of coupling efficiency.

THE INVENTION

It is thus one object of this invention to provide novel coupled polymers.

Another object of this invention is to provide a process for the production of such novel polymers.

A further object of this invention is to provide novel coupled polymers that can be effectively hydrogenated without adverse effects on the coupled polymer.

Yet a further object of this invention is to provide a process for the production of hydrogenated polymers.

Still another object of this invention is to provide a process for coupling alkali metal-terminated polymers.

A further object of this invention is to provide a novel coupling agent.

These and other objects, features, details, advantages and embodiments of this invention will become apparent to those skilled in the art from the following detailed description of the invention and the appended claims.

In accordance with this invention, we have now found that trihalo-s-triazine having the formula

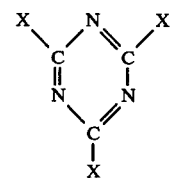

wherein X is chlorine, bromine or iodine, is an effective coupling agent for coupling alkali metal-terminated polymers.

In accordance with one embodiment of this invention, there is provided a coupled polymer having the formula

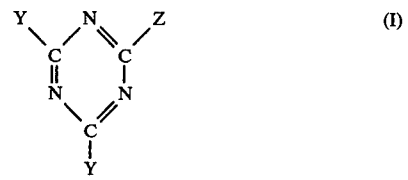

wherein the radicals Y, which can be the same or different, are selected from the group consisting of —Z and —X, wherein —X is selected from the halogen group consisting of chlorine, bromine and iodine and —Z is a polymer or copolymer chain obtained by the polymerization of at least one alkadiene having 4 to 12 carbon atoms, or a copolymer chain obtained by the copolymerization of at least one alkadiene having 4 to 12 carbon atoms, and at least one monovinylarene having 8 to 18 carbon atoms per molecule, wherein the vinyl radical is attached to an arene ring carbon atom. These polymer chains and copolymer chains can be either unhydrogenated or they can be hydrogenated to an extent that at least a portion of the olefinic unsaturation thereof is removed by this hydrogenation. The polymers of this invention are further characterized by the provision that at least 160 polymer chains Z are present in 100 coupled polymer molecules of the formula (I). In the embodiment of the hydrogenated polymers, preferably 30–99% of the olefinic unsaturation of the polymer is removed by hydrogenation.

The preferred group of acyclic conjugated alkadienes that can be polymerized into polymer chains Z are those containing 4 to 8 carbon atoms. Examples for such alkadienes are 1,3-butadiene, 2,3-dimethyl-1,3-butadiene, piperylene, 3-butyl-1,3-octadiene, isoprene, 2-phenyl-1,3-butadiene. The most preferred alkadienes are 1,3-butadiene, isoprene and piperylene.

Monovinylarenes that can be polymerized, together with the alkadienes to form the copolymer chain Z preferably are those selected from the group consisting of styrene, 3-methylstyrene, 4-methylstyrene, 4-propylstyrene, 1-vinylnaphthalene, 4-cyclohexylstyrene, 4-(p-methylphenyl)styrene, 1-vinyl-5-hexylnaphthalene. Styrene and the methylstyrenes are the presently preferred monovinylarenes.

The polymer chains —Z can be homopolymers of the alkadiene monomers defined, they can be copolymers of the alkadiene monomers defined, and they can be copolymers of at least one alkadiene monomer, and at least one monovinyl-substituted aromatic monomer. These copolymers in turn can be random or tapered copolymers, as well as block copolymers of these various monomers. The presently preferred monomers are 1,3-butadiene and styrene. The presently preferred polymer chains —Z are those in which the conjugated dienes are present in a major amount and the monovinyl-substituted arenes are present in a minor amount.

Those polymers in which the polymer chain —Z has a structure A—B— so that B is attached to a carbon atom of the s-triazine ring and in which A represents a block of monovinylarene polymer, preferably a polystyrene block, and B represents a block that confers rubbery properties to the polymer chain such as a polyalkadiene block or a copolymer block of an alkadiene and a monovinyl-substituted arene, or a combination of such blocks, constitute the presently preferred polymers. Among the blocks B conferring rubbery properties to the polymers, those are presently preferred that are obtained by polymerizing or copolymerizing butadiene or isoprene or mixtures thereof. Examples of such rubbery blocks are polybutadiene and a random copolymer of butadiene and styrene. The preferred block A is polystyrene. Such a polymer can, e.g., be made by a process wherein styrene is first polymerized with a monofunctional alkali metal initiator system to form an alkali metal terminated polystyrene block, wherein then an alkadiene such as butadiene and/or isoprene alone or in admixture, with styrene and/or a methylstyrene, is blended into the polymer mixture to form a polymer having the structure polystyrene-rubbery block-alkali metal and wherein this polymer is finally coupled with the trihalo-s-triazine coupling agent defined above. Thereby a coupled teleblock copolymer is obtained having polystyrene blocks at the free ends of the polymer chains. Such a polymer exhibits properties both of an elastomer and of a thermoplastic polymer. Therefore, such polymers can be formed into articles by standard procedures known for producing articles from thermoplastic polymers while the finished article exhibits elastomeric properties.

The molecular weight of the polymers of this invention can vary in broad ranges. For the usual applications of the coupled polymers, the weight average molecular weight will be in the range of about 10,000 to about 2,000,000.

Compounding ingredients such as fillers, dyes, pigments, softeners and reinforcing agents can be added to the polymer during compounding operations.

Furthermore, specific polymers constituting preferred embodiments of this invention are those obtained by polymerization reactions and procedures, as well as by hydrogenation steps as disclosed in detail in the following description of processes to make these polymers.

In accordance with another embodiment of this invention, there is provided a process for making the polymers defined above which comprises a coupling reaction between a living polymer having the formula M—Z and a coupling agent selected from the group consisting of the trihalo-s-triazines defined above, wherein M is an alkali metal and Z is selected from the group of polymer chains and copolymer chains of alkadienes and monovinyl-substituted arene monomers as defined above.

The quantity of the coupling agent employed with respect to the quantity of living polymer M—Z present depends largely upon the degree of coupling and the properties of the coupled polymers desired. Generally the amount of coupling agent employed is in the range of about 0.1 to 2.0 equivalents of coupling agent based upon the alkali metal present in the polymer. In other words the coupling agent is employed in a quantity so that about 0.1 to about 2 halogen atoms X are present per alkali metal atom M in the living polymer mixture. Using about 1 equivalent of coupling agent per equivalent of alkali metal present results theoretically in a 3-chain polymer, i.e., 3 polymer chains coupled by one s-triazine ring.

The temperature at which the coupling reaction is carried out can vary over a broad range and, for convenience, often is the same as the temperature of the polymerization itself. Although the temperature can vary broadly from such as 0° to 150° C, it will preferably be within the range of from about 20° to 100° C. The coupling reaction is normally carried out by simply mixing the coupling agent, neat or in solution, with the living polymer solution. The reaction period usually is quite short, for example, in the range of 1 minute to 1 hour. Longer reaction periods are required at lower temperatures. After the coupling reaction, the coupled polymers are recovered by treating the reaction mixture with terminating agents containing active hydrogens such as alcohols or water or aqueous acid solutions or mixtures thereof. It is usually preferred to add an antioxidant to the reaction mixture before isolation of the polymer.

The coupled polymer is separated from the reaction mixture by standard techniques, such as steam stripping or coagulation with a suitable non-solvent such as an alcohol. The coagulated or stripped polymer is then removed from the resulting medium by, e.g., filtration. Residual solvent and other volatiles can be removed from the isolated polymer by heating, optionally under reduced pressure or in a forced air flow.

In accordance with still another embodiment of this invention, there is provided a process for producing the non-hydrogenated polymers as defined above. This process includes basically two steps. The first step is the production of a living polymer having the formula M—Z wherein M is an alkali metal atom and Z is a non-hydrogenated polymer or copolymer chain as defined above. The second step is the coupling of the living polymer with the cyanuric chloride, bromide, or iodide as defined above.

The first step of the process is carried out by reacting a monofunctional alkali metal initiator system with the respective monomer or monomers to form the living polymer chain M—Z. This polymerization step can be carried out in one single step or in a sequence of steps depending upon the desired polymer chain. In the case where the polymer chain Z is a homopolymer or a random or tapered copolymer of two or more monomers, the monomers are simultaneously polymerized with the alkali metal initiator. In the case where the polymer chain Z is a block copolymer comprising two or more homo- or copolymer blocks, these individual blocks can be generated by incremental or sequential monomer addition.

The monomers that are generally employed, as well as the monomers that are preferably used have been defined in connection with the novel polymers above. These monomers are also preferred for the process of this invention.

Whereas several alkali metal-based initiator systems can be used in the first step of this process to make the coupled polymers of this invention, those that are based on lithium having the general formula RLi, wherein R is a hydrocarbyl radical of 1 to about 20 carbon atoms are presently preferred. Examples of suitable organomonolithium initiators include methyllithium, isopropyllithium, n-butyllithium, sec-butyllithium, t-octyllithium, n-dodecyllithium, n-eicosyllithium, phenyllithium, naphthyllithium, p-tolyllithium, 4-phenylbutyllithium, cyclohexyllithium, and 4-cyclohexylbutyllithium. The amount of the alkali metal initiator employed depends upon the desired properties of the polymer, particularly the desired molecular weight. Normally the organomonolithium initiator is employed in the range of about 0.1 to 100 gram millimoles per 100 grams of total monomers.

The polymerization reaction is carried out in the presence of a hydrocarbon diluent. Preferably the hydrocarbon diluent is a paraffinic, cycloparaffinic, or aromatic hydrocarbon having 4 to 10 carbon atoms per molecule or a mixture of such hydrocarbons. Examples of such diluents are n-hexane, n-heptane, 2,2,4-trimethylpentane, cyclohexane, benzene, and toluene. The reaction is generally carried out with a weight ratio of diluent to monomers exceeding 1. Preferably the diluent is employed in a quantity between about 400 to about 1500 parts by weight per 100 parts by weight of total monomers.

The polymerization reaction of the first step of this process usually occurs within a period of time ranging from a few minutes up to about 6 hours. Preferably the polymerization reaction is carried out within a time period of about 10 minutes to about 2 hours. The polymerization temperature is not critical and will generally be in the range of about 15° C to about 150° C, preferably in the range of about 40° C to about 90° C.

At the conclusion of the first or polymerization step, in order to carry out the second or coupling step, the polymerization mixture is blended with the coupling agent. This is done before any material that would terminate the polymerization reaction and that would remove the alkali metal from the polymer chain is added to the reaction mixture. Thus the blending of the polymerization mixture and the coupling agent is carried out before any material such as water, acid or alcohol is added to inactivate the living polymer. The second step of coupling the living polymer is thus carried out as described in detail above. Various materials are known to be detrimental to the alkali metal-initiated polymerization mixture. Particularly the presence of carbon dioxide, oxygen and water should be avoided during an organomonoalkali metal-initiated polymerization reaction of the first step of this combined process for making coupled polymers. Therefore, it is generally preferred that the reactant, initiators and the equipment be free of these materials mentioned and the reaction is carried out under an inert gas such as nitrogen.

In accordance with yet another embodiment of this invention, there is provided a process for the production of hydrogenated polymers in accordance with the formula defined above in which the polymer chain substituents Z are at least partially hydrogenated such as to remove at least a portion of the olefinic unsaturation in this polymer chain comprising alkadiene-derived units. This process basically encompasses three steps, namely a first step for producing a living polymer having the formula M—Z, a second step for coupling the living polymer and a third step for hydrogenating the coupled polymer. The first and the second steps have been described in detail above and the preferred embodiments of these steps disclosed above also are preferred embodiments for this combined process for producing a hydrogenated copolymer.

The third step of hydrogenating the coupled copolymer is carried out by blending the coupled polymer solution with a hydrogenation catalyst and free hydrogen under hydrogenation conditions. Examples of hydrogenation catalysts include nickel on Kieselguhr, Raney nickel, copper chromite, molybdenum sulfide, platinum group metals, carboxylates and alkoxides of nickel and/or cobalt reduced by trialkyl aluminum. More specifically and in accordance with further preferred embodiments, this third or hydrogenation step is generally carried out as shown in the following table:

| Ranges for Hydrogenation Step Features | | |
|---|---|---|
| | Usually Employed | Preferred Range |
| Hydrogenation catalyst, php[a] | 0.05 to 20 | 0.1 to 2 |
| Hydrogenation temperature | 0 – 250° C | 10 – 200° C |
| Hydrogen | 35 to 35,000 kPa | 70 to 3500 kPa |
| Hydrogenation time | 1 min. to 25 hrs. | 10 min. to 10 hrs. |

[a]Parts by weight per 100 parts by weight polymer.

In this embodiment of the invention, the recovery of the polymer is carried out after the hydrogenation. Antioxidants usually are added to the polymer solution. The hydrogenation catalyst is normally removed by filtration after which the hydrogenated polymer is recovered by, e.g., steam stripping or alcohol coagulation and subsequent filtration.

The polymers of this invention can be used in the fabrication of hoses, belting, extruded or molded goods and in formulating adhesives for both solution and hot melt techniques for diverse applications including those in the building construction, transportation, medical and household article fields.

The present invention will still be more fully understood from the following examples which illustrate preferred embodiments of the invention but are not intended to limit the scope thereof.

EXAMPLE I

A lithium-terminated polybutadiene was produced by polymerizing butadiene using cyclohexane as a diluent and n-butyllithium as the initiator in a standard bottle technique operation. The polymerization was carried out under nitrogen with the ingredients employed in quantities shown in the following table. The polymerization conditions are also shown in the following Table I.

TABLE I

| Recipe | phm[a] | mhm[b] |
|---|---|---|
| Cyclohexane | 760 | |
| 1,3-Butadiene | 100 | |
| Tetrahydrofuran | 6 | |
| n-Butyllithium | | 1.0[c] |
| Conditions | | |
| Temperature of polymerization | 70° C | |
| Polymerization time | 15 min. | |

[a]Parts by weight per hundred parts monomer.
[b]Gram millimoles per hundred grams monomer.
[c]Efffective amount, i.e., beyond scavenger requirement.

The obtained solution of the lithium-terminated polybutadiene was further utilized in the following example.

EXAMPLE II

In this example three runs were carried out in order to couple the living polymer obtained in Example I utilizing trichloro-s-triazine as the coupling agent. This was done by blending a sample of the solution of the lithium-terminated polybutadiene with the respective quantity of trichloro-s-triazine at 70° C and stirring the mixture throughout the coupling period of 60 minutes. The obtained products were isolated by isopropyl alcohol coagulation and vacuum drying. The inherent viscosity for the polymers obtained was determined. For Run 2 also the molecular weight, both of the parent polymer and the coupled polymer, as well as the coupling efficiency and the coupling degree were determined. The results are shown in the following Table II.

TABLE II

| Run No. | Trihalo-s-triazine meqhm[d] | Inh. Vis.[a] | Mol. wt. × 10⁻³[b] Parent Polymer | Mol. wt. × 10⁻³[b] Coupled Polymer | Coupling[e] Effic. | Coupling[e] Degree |
|---|---|---|---|---|---|---|
| 1 | 0.5 | 1.92 | —[c] | — | — | — |
| 2 | 1.0 | 2.02 | 118 | 363 | 57 | 3.0 |
| 3 | 2.0 | 1.82 | — | — | — | — |

[a]Inherent viscosity was determined in accordance with U.S. 3,278,508, column 20, note a with the modification that the solution was not filtered through a sulfur absorption tube but rather a sample of the solution was filtered through a fritted glass filter stick of grade C porosity and pressured directly into the viscometer.
[b]Determined by gel permeation chromatography in accordance with the method of G. Kraus and C. J. Stacy, J. Poly. Sci. Symposium No. 43, 329–343 (1973).
[c]A dash denotes the absence of a determination.
[d]Gram milliequivalents per one hundred grams of total monomers.
[e]Coupling efficiencies were calculated from gel permeation chromatography (GPC). Efficiency values were determined by measuring the height of the peak on the chromatograph for the residual parent polymer present in the coupled product (Pc). This was then compared with the height of the peak for the parent polymer evaluated for coupling (Pp) and the efficiency calculated from coupling efficiency = 100 × (Pp − Pc) : Pp. The degree of coupling, i.e., the average number of polymer chains coupled per molecule of coupling agent, was determined by fixing the position of the GPC peak of the parent polymer obtained by the evaluation of the uncoupled parent polymer, determining the molecular weight at this point from calibration tables derived using the universal calibration curve as per G. Kraus nd C. J. Stacy, J. Poly. Sci. Symposium No. 43, 329–343 (1973). The molecular weights for polymers containing 2, 3 and more chains are calculated and the positions of these dichain, trichain and higher chain products on the chromatograph curve are also determined from the calibration tables and marked on the curves. The degree of coupling can then be estimated by interpolation of the thus calibrated GPC curve. A coupling degree of 3, therefore, refers to the fact that the peak of the GPC curve for the coupled polymer is located at a molecular weight corresponding to a three-chain polymer.

The above data show that cyanuric chloride is an effective coupling agent for coupling lithium-terminated polybutadiene.

EXAMPLE III

This is a calculated example to demonstrate the way the coupled polymers can be hydrogenated. A sample of the coupled mixture obtained in accordance with Example II is taken prior to the addition of the isopropyl alcohol or any other hydrogen donor. The sample is warmed to 70° C in a stirred reactor and 0.5 php (part by weight per hundred parts by weight of polymer) nickel hydrogenation catalyst (formed by the reduction of nickel octanoate with triethyl aluminum at a 2/1 mol ratio of nickel compound/aluminum compound) is added. The reactor is pressured to 50 psig (350 kPa) with hydrogen and maintained at 70° C for about 3 hours with constant stirring. The reaction mixture is then treated with air and aqueous ammonium phosphate prior to filtration to remove catalyst residues. The solvent is removed by steam stripping and the polymer is recovered by filtration and drying. By this procedure a considerable portion of the olefinic unsaturation of the coupled polymer is removed, which makes this polymer more resistant towards the attack of oxygen and ozone.

Reasonable variations and modifications which will become apparent to those skilled in the art can be made in this invention without departing from the spirit and scope thereof.

We claim:

1. A polymer having the formula

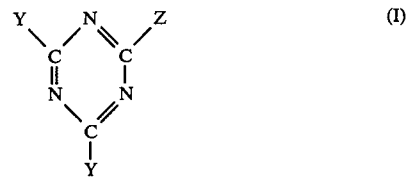

(I)

wherein the radicals Y, which can be the same or different, are selected from the group of radicals consisting of —Z and —X, wherein —X is selected from the halogen group consisting of chlorine, bromine and iodine and —Z represents polymer and copolymer chains of one or more alkadienes having 4 to 12 carbon atoms and/or copolymer chains of at least one alkadiene having 4 to 12 carbon atoms and at least one monovinyl-substituted arene having 8 to 18 carbon atoms having the vinyl radical attached to an arene ring carbon atom, said polymer and copolymer chains Z being unhydrogenated or having at least a portion of the olefinic unsaturation thereof removed by hydrogenation,
with the further provision that at least 160 polymer or copolymer chains Z are present in 100 molecules of formula (I).

2. A polymer in accordance with claim 1 wherein X is chlorine.

3. A polymer in accordance with claim 1 wherein the polymer and copolymer chains Z are selected from the group consisting of homopolymers and copolymers of butadiene, isoprene and piperylene and of copolymers of butadiene and/or isoprene and/or piperylene with styrene and/or a methylstyrene.

4. A polymer in accordance with claim 1 wherein the radicals Z have the structure A—B—, wherein A is a polystyrene block and B is a rubbery block obtained by polymerizing or copolymerizing an alkadiene selected from the group consisting of butadiene, isoprene and mixtures thereof.

5. A polymer in accordance with claim 1 wherein Z is polybutadiene.

6. A process for the production of a polymer comprising reacting an alkali metal-terminated polymer having the formula M—Z wherein M represents an alkali metal and Z represents polymer and copolymer chains of one or more alkadienes having 4 to 12 carbon atoms and/or copolymer chains of at least one alkadiene having 4 to 12 carbon atoms and at least one monovinyl-substituted arene having 8 to 18 carbon atoms having the vinyl radical attached to an arene ring carbon atom, said polymer and copolymer chains Z being unhydrogenated or having at least a portion of the olefinic unsaturation thereof removed by hydrogenation, with a trihalo-s-triazine coupling agent having the formula

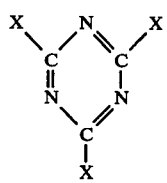

wherein X is selected from the group of halogens consisting of chlorine, bromine, and iodine.

7. A process in accordance with claim 6 wherein M is lithium.

8. A process in accordance with claim 6 wherein the coupling agent is employed in such a quantity that about 0.1 to 2 halogen atoms X are present per alkali metal atom M in the coupling reaction mixture.

9. A process in accordance with claim 6 wherein trichloro-s-triazine is used as the coupling agent.

10. A process in accordance with claim 6 wherein an alkali metalterminated polymer having the structure M—B—A is used in which A is a polystyrene block and B is a rubbery block obtained by polymerizing and copolymerizing an alkadiene selected from the group consisting of butadiene, isoprene and mixtures thereof.

11. A process in accordance with claim 6 comprising
  a. polymerizing under polymerization conditions in a hydrocarbon diluent and in contact with a monofunctional alkali metal polymerization initiator system, at least one alkadiene monomer having 4 to 12 carbon atoms, or at least one alkadiene monomer having 4 to 12 carbon atoms per molecule and at least one monovinyl-substituted arene, the vinyl substituent being attached to a ring atom of the arene ring, to obtain a solution containing an alkali metal-terminated polymer having the structure M—Z,
  b. mixing this solution and the coupling agent such as to produce a solution containing a coupled polymer, and
  c. recovering a coupled polymer from the reaction mixture of step (b).

12. A process in accordance with claim 11 wherein alkadiene monomer is selected from the group consisting of butadiene, isoprene, piperylene and mixtures thereof, and wherein said monovinyl-substituted arene is styrene, a methylstyrene or a mixture thereof.

13. A process in accordance with claim 11 wherein the alkali metal-terminated polymer M—Z is produced by incremental addition of at least two different monomers such as to form an alkali metal terminated block copolymer of at least two polymer blocks in the polymer chain Z.

14. A process in accordance with claim 11 wherein styrene is first polymerized with said monofunctional alkali metal initiator system to form a living polystyrene block in a first polymer mixture, wherein an alkadiene monomer selected from the group consisting of butadiene, isoprene and mixtures thereof alone or in admixture with a monovinylarene selected from the group consisting of styrene, methylstyrene and mixtures thereof, is blended with said first polymer mixture to form a second polymer mixture consisting of a living polymer block having a rubbery block attached to said styrene block, said alkali metal M being attached to the rubbery block, and wherein the second polymer mixture thereafter is blended with said coupling agent such as to form a third polymer mixture comprising a coupled polymer with the polystyrene blocks at the free ends of the coupled polymer chains.

15. A process in accordance with claim 11 wherein the monofunctional alkali metal initiator system comprises a lithium compound having the formula RLi, wherein R is a hydrocarbyl radical of 1 to about 20 carbon atoms.

16. A process in accordance with claim 11 wherein said diluent is selected from the group consisting of n-hexane, cyclohexane, n-heptane, 2,2,4-trimethylpentane, benzene and toluene.

17. A process in accordance with claim 11 wherein about 0.1 to about 100 gram millimoles of monofunctional alkali metal initiator are used per 100 grams of total monomer.

18. A process in accordance with claim 6 further comprising the steps of
  a. reacting the mixture obtained during the coupling step in the presence of a hydrogenation catalyst and in the presence of free hydrogen to obtain an at least partially hydrogenated polymer, and
  b. recovering the thus obtained at least partially hydrogenated polymer as the product of the process.

* * * * *